(12) United States Patent
Meller et al.

(10) Patent No.: US 8,689,209 B2
(45) Date of Patent: Apr. 1, 2014

(54) UPDATING CONTENT WITHOUT USING A MINI OPERATING SYSTEM

(75) Inventors: Evyatar Meller, Yad Binyamin (IL); Yair Noam, Ramat-Gan (IL)

(73) Assignee: Red Bend Ltd., Hod Hasharon (IL)

( * ) Notice: Subject to any disclaimer, the term of this patent is extended or adjusted under 35 U.S.C. 154(b) by 1240 days.

(21) Appl. No.: 12/535,101

(22) Filed: Aug. 4, 2009

(65) Prior Publication Data

US 2010/0031246 A1 Feb. 4, 2010

Related U.S. Application Data

(60) Provisional application No. 61/085,877, filed on Aug. 4, 2008.

(51) Int. Cl.
*G06F 9/44* (2006.01)

(52) U.S. Cl.
USPC .......................................................... 717/173

(58) Field of Classification Search
USPC .................................................. 717/168–173
See application file for complete search history.

(56) References Cited

U.S. PATENT DOCUMENTS

| | | | |
|---|---|---|---|
| 6,018,747 A | 1/2000 | Burns | |
| 6,546,552 B1 | 4/2003 | Peleg | |
| 6,832,373 B2 | 12/2004 | O'Neill | |
| 2002/0100036 A1 | 7/2002 | Moshir et al. | |
| 2003/0163805 A1 | 8/2003 | Hata et al. | |
| 2005/0114852 A1* | 5/2005 | Chen et al. | 717/168 |
| 2005/0132359 A1* | 6/2005 | McGuire et al. | 717/175 |
| 2005/0216530 A1 | 9/2005 | Meller | |
| 2005/0257206 A1 | 11/2005 | Semerdzhiev | |
| 2006/0130046 A1* | 6/2006 | O'Neill | 717/168 |

FOREIGN PATENT DOCUMENTS

| | | |
|---|---|---|
| WO | 2004063899 | 7/2004 |
| WO | WO2004/114130 | 12/2004 |
| WO | WO2005/003963 | 1/2005 |
| WO | 2005024628 | 3/2005 |
| WO | WO2007/023497 | 3/2007 |

OTHER PUBLICATIONS

International search report of the International searching authority for PCT/IL2009/000762 dated Mar. 25, 2010.
Written Opinion of the International searching authority for PCT/IL2009/000762 dated Mar. 25, 2010.

* cited by examiner

*Primary Examiner* — Anna Deng
(74) *Attorney, Agent, or Firm* — Buchanan Ingersoll & Rooney PC

(57) ABSTRACT

A method of in-place updating an original version of content to an updated version of content, in a non-volatile memory storage device, wherein the storage device comprises a non-paged part of the content, wherein the non-paged memory part includes an original update library, and wherein the storage device is being used in a normal mode of operation or in an update mode of operation, the method includes: obtaining an update package required for updating the original version of content to the updated version of content; obtaining a new update library; storing the new update library in a second non-volatile storage; and updating the original version of content to the updated version of content, in a non-volatile memory storage device, using the at least new update library and the update package.

14 Claims, 7 Drawing Sheets

UPDATING CONTENT WITHOUT USING A MINI OPERATING SYSTEM

CROSS REFERENCE TO RELATED APPLICATIONS

This U.S. Patent Application claims priority to U.S. Provisional Application No. 61/085,877, filed on Aug. 4, 2008, which is incorporated herein by reference.

BACKGROUND

1. Technical Field

This invention relates to updating content stored in a storage memory device. More specifically, this invention relates to in-place updating an original version of content in a non-volatile storage to an updated version.

2. Discussion of Related Art

It is sometimes required to update content stored in a storage device. For example, if the content is a program (such as an executable file), it is sometimes required to fix a bug existing therein or introduce new features thereto. Yet, the latter example is non-limiting and other types of content may also require updates, such as text, data stored in a database, etc. The terms "old version" or "original version" refer to a version of content before update, and the terms "new version" or "updated version" refer to a version that includes already updated content. In other words, an original (or old) version includes "original (or old) content" while an updated (or new) version includes "updated (or new) content". It should be noted that updated content can be further updated. In case of a second update, for example, the updated content of the first update turns to be original content of the second update while new updated content is generated by the second update etc.

A process during which original content is updated, yielding updated content is referred to as an "update process". The update process usually requires instructions on how to perform the update. Such instructions constitute together an "update package", wherein each instruction included therein constitutes an "update command". That is, an update package is obtained as input, and during the update process original content is updated to updated content in accordance therewith. This is non-limiting though and sometimes more than one update package can be obtained which together allow the updating of content. Alternatively, instead of an update package being obtained, an update package (or a set of update commands) may be retrieved from a storage or from a database etc. Hence, hereinafter, when referring to the term "obtaining an update package" it should be appreciated that the update package can be passively obtained or actively retrieved, or sometimes an embedded package (e.g., a hard coded set of update commands) can be activated.

One way to update an original version to an updated version is storing the updated version in the storage in addition to the original version. For example, a computer program "prog.exe" is activated whenever a user presses a certain icon on the PC (Personal Computer) windows desktop. In order to update prog.exe it is possible to store the updated version of this file in a different location than the present (original) version, and then reset the path associated with the icon so as to activate the updated version instead of the original version. Later, when it is ascertained that the update process completed successfully, the original version can be deleted safely, releasing the space occupied thereby. In addition to increasing storage consumption, this latter update method requires that the complete updated version be provided to the update process, e.g., in the update package.

One way for reducing the size of an update package is by including in it information representing the differences between the original and updated content. Such an update package is sometimes referred to also as a "difference", a "difference result" or a "delta". The update process, upon operating in accordance with a delta, applies it to the original content, hence producing the updated content. Deltas may be produced using the known in the art differencing algorithms (such as "GNU diff") in a naïve manner, though such deltas tend to be rather large.

The size of the delta being considered, there are methods trying to reduce the size thereof. For example, U.S. Pat. No. 6,546,552 ("Difference extraction between two versions of data-tables containing intra-references", published 2003) discloses a method for generating a compact difference result between an old program and a new program. Each program includes reference entries that contain references that refer to other entries in the program. According to the method of U.S. Pat. No. 6,546,552, the old program is scanned and for each reference entry, the reference is replaced by a distinct label mark, whereby a modified old program is generated. In addition, according to U.S. Pat. No. 6,546,552, the new program is scanned and for each reference entry the reference is replaced by a distinct label mark, whereby a modified new program is generated. Thus, utilizing directly or indirectly the modified old program and modified new program, the difference result is generated.

WO 2004/114130 ("Method and system for updating versions of content stored in a storage device", published 2004) discloses another system and method for generating a compact update package between an old version of content and a new version of content. The system of WO 2004/114130 includes a conversion element generator for generating a conversion element associated with the old version and new version. It also includes a modified version generator for generating a modified version, and an update package generator for generating the compact update package. The compact update package includes the conversion element and a modified delta based on the modified version and the new version.

WO 2005/003963 ("Method and system for updating versions of content stored in a storage device", published 2005) discloses a system and method for updating versions of content stored in a storage. The system of WO 2005/003963 includes an update module for obtaining a conversion element and a small delta. It also includes a converted old items generator for generating converted old items by applying the conversion element to items of an old version, a data entries generator for generating data entries based on the modified data entries and on the converted old item, and a new version generator for generating a new version of content by applying the commands and the data entries to the old version.

It was noted before that a certain type of update package is sometimes referred to as a delta, however, this is non-limiting, and as it appears from WO 2004/114130 and WO 2005/003963, an update package may sometimes include a delta therewith, or as another example the update package may include the entire updated version.

Other methods exist in the art which take care of additional considerations involved in the update. Prior to elaborating on other methods these considerations should be pointed out.

It is appreciated that content is normally stored in a storage. A storage can include volatile memory, i.e. volatile storage (such as Random Access Memory RAM, etc.) and/or non-volatile memory, i.e. non-volatile storage (such as a hard disk, flash memory, EPROM (Erasable Programmable Read-Only Memory) and/or EEPROM (Electrically EPROM), etc).

There are storages that are organized in discrete areas, referred to, e.g., as blocks or sectors, wherein one block can include content belonging to more than one file. Hence, if there are, for example, two files stored in a storage, a single block can include several ('x') bytes belonging to a first of the two files, as well as several ('y') bytes belonging to a second of the two files. If the size of a block is 'z' bytes, it is clear that z>=x+y. Yet, those versed in the art would appreciate that writing content into a block affects other content stored therein. That is, if it is required to re-write the content stored in the x bytes of the first file (e.g., during update thereof), due to storage limitations it may be impossible to write only those x bytes, and it may be necessary to write the content of all the z bytes to the storage. This can be done, for example, by reading content stored in the z bytes from the non-volatile storage to a volatile storage not including blocks, such as RAM, updating only the content stored in the x bytes in the volatile storage (that is, the content of the other z-x bytes is left unaffected therein) and then writing the content of the z bytes back to the non-volatile storage. This limitation characterizes flash memory, for example, wherein it is required to completely delete the present content of a block, before new content (including updated content) can be written thereto, and hard disks where it is not obligatory to delete the complete sector before writing data thereto, but it is required to write the complete content of a block in one writing operation (e.g., it is impossible to write only x bytes when leaving the content stored in the z-x bytes unaffected. In order to leave the z-x bytes unaffected, it is required to store the content thereof in the volatile memory and write them back into the block, together with the x bytes). Hence, the update procedure may require many write operations to the storage including blocks, and it is appreciated that if it is desirable to achieve an efficient update, the update should better be optimized. For example, if x equals, for example, two bytes, than these two bytes should better be updated together, instead of updating the first byte and then the second byte, writing these two bytes separately into the block.

Furthermore, when in-place updating an original version (including original content) to an updated version (including updated content), there are sometimes update commands that use original content in order to generate updated content. For example, it is possible to copy original content from one place to a different place in the storage, wherein this copied content, in its destination place, forms part of the updated version. When copying content to a destination place it should be appreciated that this destination place could have been used before for storing other content (possibly also being part of the original version). Hence, the copied content can overwrite the original content at the destination place. Still further, it is possible that there is another update command that uses the destination place's original content in order to generate updated content. If this other update command is called further to operating in accordance with the first copy command, the destination place's original content can be already overwritten. This situation constitutes a "write before read conflict". Herein below unless otherwise noted the term "conflict" is used for short for "write before read conflict".

Write before read conflicts are a known problem in the art and U.S. Pat. No. 6,018,747 tries to cope therewith.

U.S. Pat. No. 6,018,747 ("Method for generating and reconstructing in-place delta files", published 2000) discloses a method, apparatus, and article of manufacture for generating, transmitting, replicating, and rebuilding in-place reconstruct software updates to a file from a source computer to a target computer. U.S. Pat. No. 6,018,747 stores the first version of the file and the updates to the first version of the file in the memory of the source computer. The first version is also stored in the memory of the target computer. The updates are then transmitted from the memory of the source computer to the memory of the target computer. These updates are used at the target computer to build the second version of the file in-place.

According to U.S. Pat. No. 6,018,747, when a delta file attempts to read from a memory offset that has already been overwritten, this will result in an incorrect reconstruction since the prior version data has been overwritten. This is termed a write before read conflict. U.S. Pat. No. 6,018,747 teaches how to post-process a delta file in order to create a delta file, minimize the number of write before read conflicts, and then replace copy commands with add commands to eliminate conflicts, thus converting a delta file to an equivalent but larger delta file. A digraph is generated, for representing the write before read conflicts between copy commands. A schedule is generated that eliminates write before read conflicts by converting this digraph into an acyclic digraph.

Another known problem in the art is reliability of the update process, or fail safe update. This problem occurs, for example, when a process of updating an original version is interrupted before its normal termination, such as in a power failure. In such a case, there is a possibility that the content of the block which was being updated during the interruption may become corrupted and contain unexpected content.

It was already mentioned before that when in-place updating blocks of content, an original content of a block sometimes forms part of the input used by the update process. In such a case, if the original block (which is corrupted due to interruption) is required, the update process may be unable to resume. It can be impossible to re-update the corrupted block.

U.S. Pat. No. 6,832,373 ("System and method for updating and distributing information", published 2004), for example, tries to provide a fail safe update. It discloses devices, systems and methods for updating digital information sequences that are comprised by software, devices, and data. In addition, these digital information sequences may be stored and used in various forms, including, but not limited to files, memory locations, and/or embedded storage locations. Furthermore, the devices, systems, and methods described in U.S. Pat. No. 6,832,373 provide a developer skilled in the art with an ability to generate update information as needed and, additionally, allow users to proceed through a simplified update path, which is not error-prone, and according to U.S. Pat. No. 6,832,373's inventors, may be performed more quickly than through the use of technologies existing when U.S. Pat. No. 6,832,373 was filed.

That is, U.S. Pat. No. 6,832,373 describes using an auxiliary backup block, while all block update operations are performed thereby using two phases 'two-phase protocol' or 'two-phase commit'. According to U.S. Pat. No. 6,832,373, in a first phase of updating a block, the update process writes the updated content to the auxiliary backup block and verifies that the content is correctly stored. In a second phase, the update process writes the updated content into its target block to form the updated content of the updated target block (thereby overwriting the original content of the target block). Yet, variations of the same method exist, such as copying the original content of the target block into the auxiliary backup block in the first phase, and in the second phase in-place updating the target block to store the updated content.

The two phase commit (whether the backed up content is the original content or the updated content) can use only one additional backup block, yet, it is time consuming, since every write operation requires performing two operations (for the two phases). In addition, according to U.S. Pat. No. 6,832, 373 every backup operation backs up the complete (original or updated) content of a block in the auxiliary backup block, and hence if the number of blocks whose content is updated by the update process is n, the total number of operations required for the update process (including update operations and write operations into the auxiliary backup block) cannot be smaller than 2n. If there are blocks in which content is stored in more than one write operation, the number of operations that the update process is required to perform will be even larger than 2n.

WO 2007/023497 ("Method and system for in-place updating content stored in a storage device", published 2007) discloses a system and method for reliable in-place update, performing m block storage operations, including write operations and backup operations, wherein $2<=m<2n$. WO 2007/023497 protects before updating all the original content requiring protection, using a protection buffer (also known as a backup buffer) and the delta file. Thus, WO 2007/023497 resolves write before read conflicts as well as maintaining reliable update.

During an update process some or all of the stored original content of the updatable device is updated. The term "updatable device" or "device" refers to any device that is associated with a storage and which allows updating content stored therein. Typically, the stored original content of the updatable device includes software for normal mode process(es), that is for process(es) unrelated to the updating of the content (called here software for the core). Additionally, the stored original content includes software for the update process which is executed during the update mode, that is software related to updating the stored original content (called here software for the "miniOS", mini-operating system). During the update process, some or all of the stored software for the core and/or for the miniOS is updated. It is noted however that there are certain task(s) which is/are neither exclusive to the update process nor to the other unrelated process(es), and therefore may potentially be required both during the update process and during other unrelated process(es) performed by the updatable device. Such task(s) may include for example non-volatile memory read/write, basic user interface such as keyboard functions, etc. Since the core software is subject to updates, in order for an update task to be executable both by the core and the miniOS, the software procedure defining the update-task must be duplicated and stored twice, both as part of the software for the core and as part of the software for the miniOS, being capable of re-writing the core in-place during the update process. In some cases, each storage of the (duplicated) procedure(s) which may potentially be required both during the update process and during other process(es) necessitates about 5 Megabytes. It is noted that the miniOS also performs tasks unique to the update process (and which are typically not executed by the core), and therefore the miniOS also includes modules such as an update agent (UA) and update installer (UPI) which typically operate only during the update process. However, in some cases the software for the UA and UPI together have a size of between 200 and 400 Kbytes, and therefore the duplicated procedure(s) comprised in the miniOS typically take(s) up a more substantial part of storage than the UA and UPI.

Refer to FIG. 1 which shows a simplified layout of a non-volatile memory 110 comprised in a storage associated with an updatable device. As illustrated in FIG. 1, non-volatile memory 110 includes a section 112 for storing software for a boot loader, a "critical" section 116 for storing software for the miniOS, a backup section 114 for storing a backup of software for the miniOS, a section 118 for storing the software for the non-paged part of the core, a section 120 for storing the software for the paged part of the core, a file system section 122 for storing inter-alia an update package, and a section with one or more backup buffer(s) 124 for storing a normal mode/update mode flag and possibly other data. The stored software for the miniOS includes: software for the UA, software for the UPI, non-volatile memory read/write drivers, and any other "duplicated" procedure(s) for tasks that may potentially be required both during the update process and during other unrelated process(es).

In operation, when an updatable device is reset, the boot loader checks a normal/update flag in a designated backup buffer 124. As mentioned above, in this configuration the update process is performed only during the update mode, and any process which is unrelated to the update process is performed during normal mode. It is noted that in this configuration the boot loader is kept minimal with the boot loader capable of writing to volatile memory but not to non-volatile memory 110 and with the boot loader incapable of even accessing file system 122. If the flag indicates "normal" mode, the boot loader loads the software for the non-paged core to volatile memory. The non-paged core then starts the normal mode of operation of the updatable device as is known in the art.

If instead the flag indicates update mode, the boot loader loads the (original) software for the miniOS to volatile memory. Subsequently the boot loader invokes the original UA (whose software, being part of the miniOS software, is now in volatile memory). The UA then obtains an update package from the location where the update package was previously stored by a device management application. The update package relates to updating some or all of the software for the non-paged core and/or paged core, and optionally relates to updating some or all of the software for the miniOS (It should be understood therefore that an updated version of software may in some cases include some identical content as in the original version.) The UA then stores the obtained update package in file system 122.

If update of the miniOS software is required, the UA invokes the UPI (whose software, being part of the miniOS software, is now in volatile memory) to update the software of the miniOS, and the UA stores a backup of the updated miniOS software in backup 114. It is noted that for reliability purposes critical section 116 is not updated in-place. Rather, the updated software for the miniOS is written to backup 114 and not immediately to critical section 116 so that if during the writing there is an interruption which erases the volatile memory, the update may be reliably resumed with the original version of the software for the miniOS still stored in critical section 116. Once the updated software for the miniOS has been completely written to backup section 114, the UA overwrites the original version of the software for the miniOS in critical section 116 with the updated backup of the software for miniOS (thereby causing critical section 116 to also contain updated software for the miniOS). Assuming that the software for the miniOS has been updated in critical section 116, the boot loader then loads the updated software for the miniOS from critical section 116 to volatile memory and invokes the updated UA (whose software, being part of the miniOS software is now in volatile memory).

The invoked UA (updated or original as described above) then invokes the UPI (updated or original) to update in-place the non-paged core and paged core in sections 118 and 116 respectively (and optionally to update other content in non-volatile memory 110). Once the update has been finished, the UA replaces the update mode flag with the normal mode flag in the designated backup buffer 124. The boot loader then loads the updated software for the non-paged core to volatile memory, invokes the updated non-paged core, and the updated non-paged core starts the normal mode of operation of the updatable device as is known in the art.

What are needed in the art are methods, apparatuses, and memories which avoid storage duplication of procedure(s) which define(s) task(s) that may potentially be required both during the update process and during other unrelated process(es) performed by the updatable device.

BRIEF SUMMARY

According to the present invention, there is provided a method of in-place updating an original version of content to an updated version of content, in a non-volatile memory storage device, wherein the storage device comprises a non-paged part of the content, wherein the non-paged memory section comprises an original update library, and wherein the storage device is being used in a normal mode of operation or in an update mode of operation, the method comprising: obtaining an update package required for updating the original version of content to the updated version of content; obtaining a new update library; storing the new update library in a second non-volatile storage; and updating the original version of content to the updated version of content, in a non-volatile memory storage device, using the at least new update library and the update package.

According to the present invention, there is also provided a system for updating an original version of content to an updated version of content, in a non-volatile memory storage device enabling a normal mode and an update mode, the system comprising: a non-paged memory part on a non-volatile memory, wherein the non-paged memory part comprises an update library and an update agent; and a boot loader, wherein the update agent is arranged to: obtain an update package comprising a update file that comprises commands and data required for updating an original version of content to an updated version of content; derive, from the update file, a library file comprising commands and data required for at least updating the update library on the non-paged memory section; store the library file on a non-volatile memory; wherein the boot loader is arranged to: obtain a new update library to the volatile memory; and store the new update library on the non-volatile backup buffer.

According to the present invention, there is further provided an apparatus for updating content in-place, comprising: a non-volatile memory configured to store content; a non-paged core configured to update content in-place in the non-volatile memory and configured to perform tasks unrelated to updating content; and a boot loader configured to invoke the non-paged core in update mode and in normal mode of operation of a device associated with the non-volatile memory.

According to the present invention, there is still further provided a non-volatile memory associated with a device which stores original content that is updated in an in-place update process to yield updated content, comprising: a section for storing software for a non-paged core, the software including at least a procedure defining a task potentially required for the update process but never for any process unrelated to the update process, a procedure defining a task potentially required for a process unrelated to the update process but never for the update process, and a procedure defining a task potentially required both for the update process and for another process unrelated to the update process.

According to the present invention, there is provided a program storage device readable by machine, tangibly embodying a program of instructions executable by the machine to perform method steps for operating a device, including an update process for updating in-place original content stored in a non-volatile memory associated with the device to yield updated content, the method steps comprising: providing a non-paged core which is capable of performing tasks related to the update process and tasks unrelated to the update process; the non-paged core performing at least one task unrelated to the update process in normal mode of the device; and the non-paged core performing at least one task relating to the update process in update mode of the device.

According to the present invention, there is also provided a program storage device readable by machine, tangibly embodying a program of instructions executable by the machine to perform method steps for resuming an in-place update process which updates original content stored in a non-volatile memory associated with a device to yield updated content, comprising: backing up in non-volatile memory an updated version of software for at least part of a non-paged core which is capable of performing both tasks related to the update process and tasks unrelated to the update process; and after an interruption which erases volatile memory when the non-volatile memory includes original software content for the non-paged core which still needs to be replaced during the update process, performing the following: loading the backed up updated version to volatile memory; if the updated version includes updated software for only part of the non-paged core then invoking the part in order to construct in volatile memory or load into volatile memory an updated version of software for the non-paged core, and invoking the updated non-paged core to complete a replacement in non-volatile memory of all original software content for the non-paged core which is required to be replaced with updated content during the update process.

According to the present invention, there is further provided a computer program comprising computer program code means for performing a method of the invention when the program is run on a computer. According to the present invention, there is yet further provided a computer program embodied on a computer readable medium.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
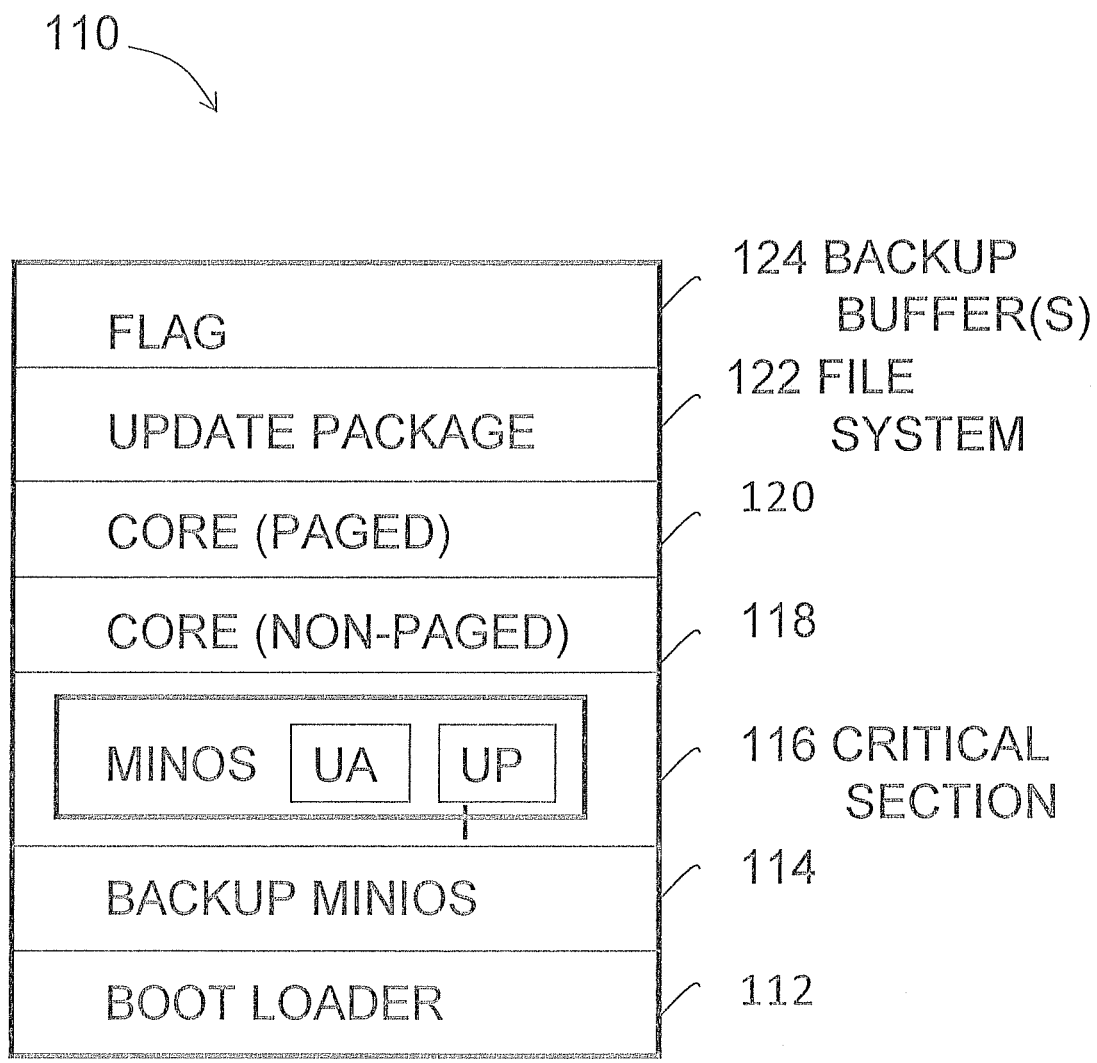
FIG. 1 is a simplified layout of a conventional non-volatile memory.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
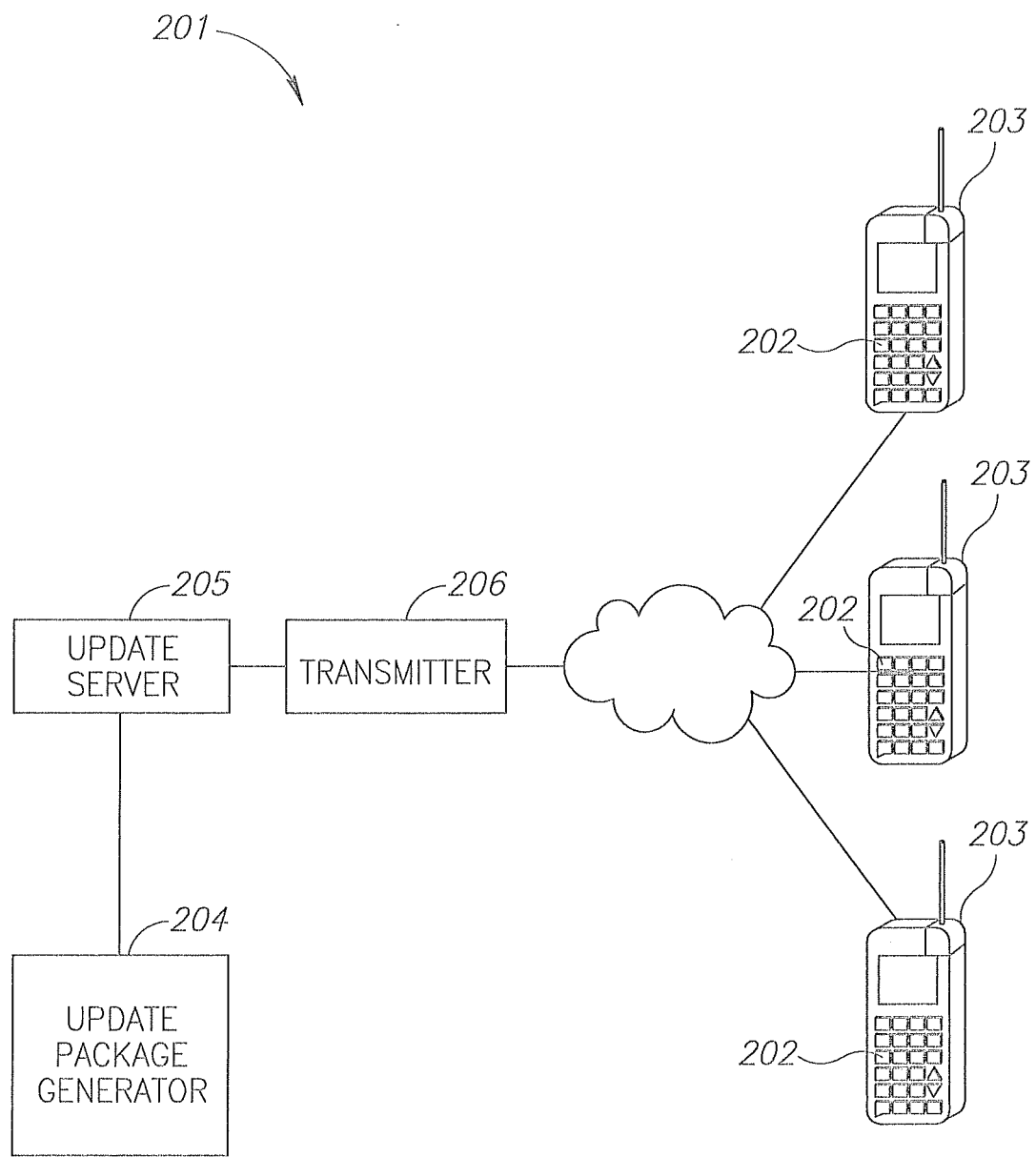
FIG. 2 is a schematic illustration of a system for updating content in a cellular network, in accordance with an embodiment of the invention.

FIG. 2 is a schematic illustration of a system 201 for updating content in a cellular network, in accordance with one embodiment of the invention. Cellular telephones 202, associated with storages 203 execute software that enable operation of the cellular telephones and/or updating of the cellular telephones. Storages, such as storages 203, are sometimes referred to also as "memories" or "memory units". Software for a particular cellular telephone 202 is normally stored in associated storage 203. Some or all of storage 203 associated with a particular cellular telephone 202 may be coupled to the cellular telephone and therefore detachable from the cellular telephone. The coupled storage may be local and/or remote to the cellular telephone. Additionally or alternatively, some or all of storage 203 associated with a cellular telephone 202 may be inside the cellular telephone.

It is noted that for simplicity of illustration and description only one storage 203 is illustrated and described per cellular telephone 202, but the reader should understand that any particular associated storage 203 may comprise one or more divisible units. In embodiments where there is a plurality of divisible units comprised in storage 203, the plurality of units may all be detachable from associated cellular telephone 202, may all be within associated cellular telephone 202 or may be divided between unit(s) which are detachable and unit(s) which are within associated cellular telephone 202.

It also should be noted that the system 201 illustrated in FIG. 2 is a non-limiting example and the invention is not limited to updating software. Many other types of content stored in storages require update, such as text, data stored in databases, files stored in the storages etc. The version of the software currently executing on a cellular telephone or any other content currently applicable to the cellular telephone is referred to, hereinafter, as an "old version", "old content", "original version" "original content", or variations thereof.

Sometimes there is a need to update the software in order for a telephone 202 to execute a newer version thereof, or to update any other content to a newer version, with the new version referred to, hereinafter as an "updated version", "updated content", "new version", "new content", or variations thereof. Such an updated version is generated in accordance with an update package (which in some examples includes a "delta file") that the telephone receives.

According to the invention, an update package is generated in an update package generator 204, operating, for example, in a personal computer (PC) or in any other type of computer. The update package is stored in an update server 205 and transmitted, via a transmitter 206 to the cellular telephones 202. Hence it is clear that the update server, or the update generator includes or has access to a non-volatile memory on which the update package can be stored.

In the same way, the invention is not limited to cellular networks and/or to cellular telephones 202. It should be appreciated that cellular telephones belong to a group referred to as embedded devices. There are other embedded devices, such as Personal Digital Assistants (PDAs), set-top boxes and other consumer electronic devices that are associated with storages for storing content, and sometimes it is required to update the content stored therein. Yet, it is possible to update also content stored in storages associated with non-embedded devices, such as PCs or other computers. Storages 203 can include volatile memory (such as Random Access Memory RAM, etc) and/or non-volatile memory (such as a hard disk drive, flash memory unit, EPROM (Erasable Programmable Read-Only Memory) and/or EEPROM (Electrically EPROM), etc).

For example, a PC, or any other computer, can store files that include data required for its operation or for operation of software executing therein (such as "info files" or "dot files" known for those versed in the art). Sometimes it is required to update this data, for example, via communication lines, e.g., via the Internet or via any other communication means.

Understanding this, the term "content" will be used to mean any type of content including inter-alia software, text, data stored in databases, files stored in the storage, etc. Moreover, instead of using terms such as "telephones", "PDAs" "consumer electronic devices", "computers", "PCs", etc., the term "updatable devices" or "devices" will be used hereinafter, and it should be noted as mentioned above that the term "updatable device" or "device" as used herein can refer to any device that is associated with a storage 203 and allows updating content stored therein.

It was previously explained that in order to update content stored in storages 203, update packages are generated, stored in the update server 205 and conveyed to the updatable devices (such as the cellular telephones 202) and the storages 203 associated therewith. Alternatively, it is possible to convey an update package without storing it first in an update server 205. For example, it is possible to convey the update package directly from the update package generator where it is generated. In such a case the machine where the update generator operates, or the update generator itself is considered as the update server 205.

Furthermore, in the example illustrated in FIG. 2 the update package is conveyed via the transmitter 206. This is also non-limiting and any other way applicable for conveying the update package can be used. For example, it is possible to store the update package on a portable storage 203 such as a compact disk or disk-on-key thus allowing an updatable device (such as the telephones 202) to access the update package by reading it therefrom. Herein below, for simplicity of description, storage 203 and/or the updatable device (such as cellular telephone 202) will be written without reference numerals.

It is noted that the single form of update package used herein refers both to embodiments where a single update package provides instructions for an update process and where a plurality of update packages together provide instructions for an update process.

Figure 3:
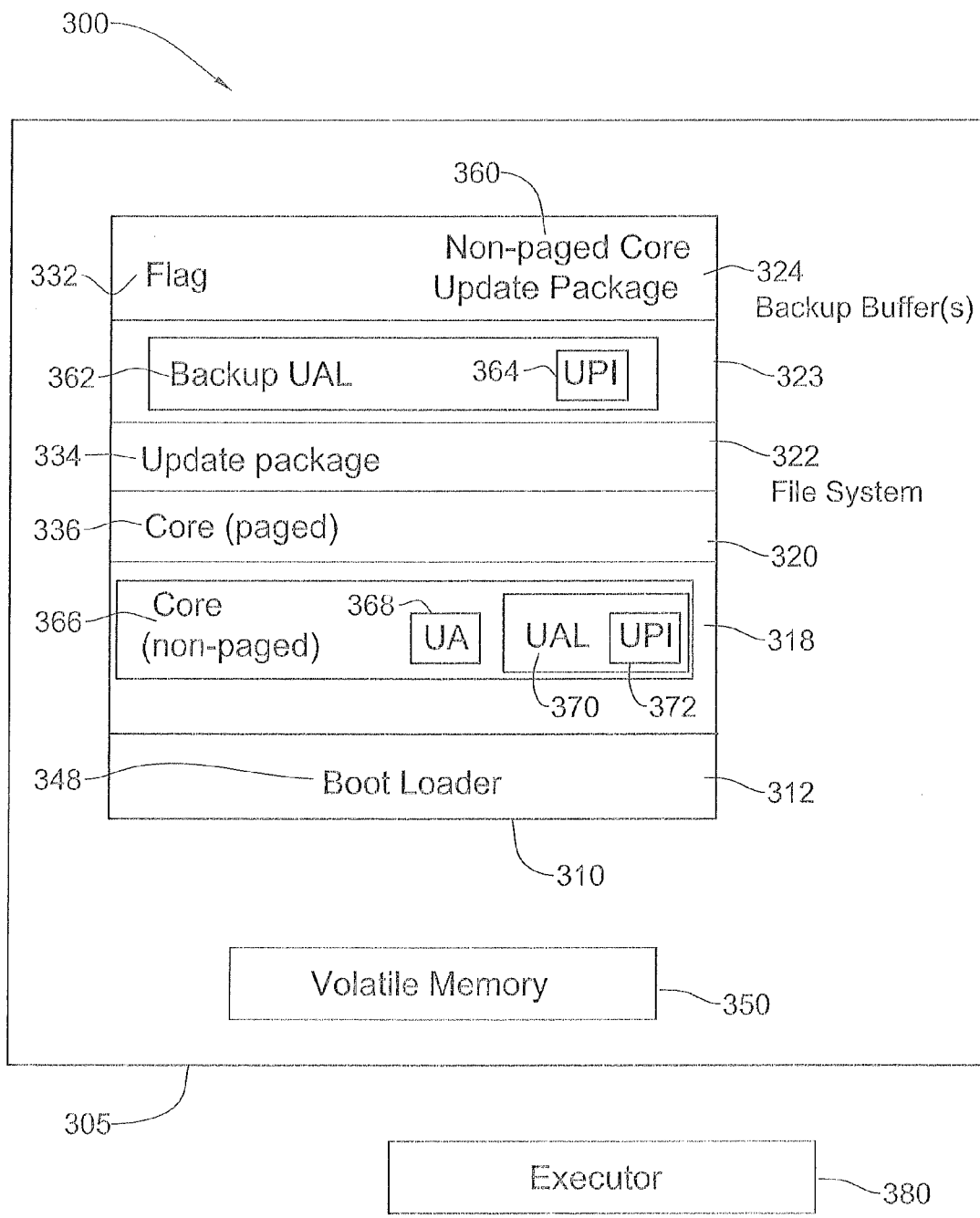
FIG. 3 is a simplified layout of an apparatus for updating content in-place, in accordance with an embodiment of the present invention.

FIG. 3 illustrates a simplified layout of an apparatus 300 for updating content in-place, according to an embodiment of the present invention. For example, an updatable device (along with associated storage) may comprise apparatus 300.

Apparatus 300 includes, inter-alia, an executor 380 which is configured to execute software, and a memory 305. Memory 305 comprises volatile memory 350 (e.g. RAM) and non-volatile memory 310 (e.g. Flash). For example, executor 380 may comprise any suitable hardware capable of carrying out task(s) as defined in software which is stored in non-volatile memory 310 and loaded to volatile memory 350 during the methods described herein. Memory 305 is comprised in the storage associated with the updatable device (although the associated storage may in some cases include additional memory which is irrelevant to described embodiments of the invention and therefore neither illustrated nor described). In the illustrated embodiment, non-volatile memory 310 includes a section 312 for storing software for boot loader 348, sections 318 and 320 for respectively storing software for a non-paged core 366 and a paged core 336, a file system section 322 for storing inter-alia an update package 334, a section 323 for backing up software for an update agent library (UAL) 362, and one or more backup buffers 324 for storing inter-alia any of the following: a normal mode/update mode of operation flag 332 and a non-paged core update package 360 (i.e. the part of update package 334 which relates to the non-paged core). In one embodiment, the software for non-paged core 366 and the software for paged core 336 are dissimilar in that the software for non-paged core 366 may be loaded in its entirety from non-volatile memory 310 to volatile memory 350. However, in this embodiment software for paged core 336 may not be loaded in its entirety to volatile memory 350 but various "pages" of paged core 336 are instead loaded into (or swapped out of) volatile memory 350 as needed, as is known in the art.

When executor 380 runs software which has been loaded to volatile memory 350, one or more task(s) which are defined in the software are carried out by the hardware comprised in executor 380. A single executor 380 is illustrated, for simplicity of illustration but it is possible that in some embodiments, different executors run different software.

It is evident thus that the combination of executor 380 and particular software comprises a module capable of performing one or more tasks (AKA one or more operations). Practically, therefore, apparatus 300 may be considered to have a configuration comprising the following modules, inter-alia: boot loader 348, non-paged core 366, paged core 336, non-volatile memory 310 and volatile memory 350. Certain tasks assigned to non-paged core 366 are in fact performed by the following (sub) modules of non-paged core 366: update agent "UA" 368 and update agent library "UAL" 370 (wrapping update installer "UPI" module 372). In order to avoid confusion, the UAL module and the wrapped UPI are instead labeled respectively with the numbers 362 and 364 (rather than 370 and 372) when the software running is the backup version. Non-paged core 366 may in some cases comprise other sub-modules, any of which is only described below if necessary for the understanding of the invention. In other embodiments, there may be fewer, more and/or different modules in apparatus 300 than listed above.

In this configuration of apparatus 300, each of boot loader 348, non-paged core 366, paged core 336, update agent 368, update agent library 370/362 and update installer 377/364 modules may comprise any combination of hardware, software and/or firmware capable of performing the tasks defined and described herein.

In the illustrated embodiment, the core performs tasks vital for the updatable device, and therefore a user typically although not necessarily does not have permission to change the software for the core, but the core may be updated in an update process.

For example, in the illustrated embodiment, non-paged core 366 is capable of performing task(s) unrelated to the updating of content in non-volatile memory 310 during the update process, as well as task(s) relating to the updating of content in non-volatile memory during the update process. The stored software for non-paged core 366 may therefore include software procedures defining tasks which may potentially be required for the update process and/or for process(es) unrelated to the update processes (i.e. the stored software for non-paged core 366 includes procedure(s) defining task(s) which may potentially be required only during the update process, procedure(s) defining task(s) which may potentially be required only for one or more processes unrelated to the update process, and procedure(s) defining task(s) which may potentially be required both during the update process and during one or more processes unrelated to the update process). Therefore, in the illustrated embodiment, there is no need to duplicate storage in non-volatile memory 310 for a procedure which defines a task that may potentially be required both during the update process and during process(es) unrelated to the update process. Similarly, in the illustrated embodiment, there is no need to have separate modules for updating content and for unrelated processes where both would be capable of performing a particular task which could be potentially be required both when updating content and during unrelated process(es).

For instance, driver(s) for reading from and writing to non-volatile memory 310 may potentially be required both during the update process and during other processes unrelated to the update process. Software for such driver(s) can be stored only once as part of the stored software for non-paged core 366, with non-paged core 366 performing the reading and writing to non-volatile memory 310 both during the update process and during unrelated processes. These drivers may be considered a sub-module of non-paged core 366 and may comprise any combination of hardware, software and/or firmware capable of reading and/or writing to non-volatile memory 310.

UA 368 (which may be considered a sub module of non-paged core 366) performs certain tasks assigned to non-paged core 366. For example, in one embodiment UA 368 may perform any of the following: reading update package from non-volatile memory, reading/writing to volatile memory, reading/writing to non-volatile memory (by invoking the aforementioned non-volatile memory driver(s)), calling the UAL, accessing file system 322, etc. More details on certain tasks performed by UA 368 in some embodiments will become apparent from the description.

UAL 362 or 370 (also a sub module of non-paged core 366) performs certain tasks assigned to non-paged core 366. For example, in one embodiment UAL 362/370 may perform any of the following: wrap a UPI to enable unified access to the UPI by the update agent or the boot loader, receive pointers to any modules to be invoked by the UAL, etc. Continuing with the example, in some cases the UAL may receive a pointer to the non-volatile memory read or write driver(s) in non-paged core 366 from UA 368, and then invoke the non-volatile memory read or write driver(s). More details on certain tasks performed by the UAL in some embodiments will become apparent from the description.

UPI 372 or 364 (wrapped by UAL 370 or 362) performs certain tasks assigned to non-paged core 366. For example, in one embodiment UPI 372 or 364 may perform any of the following: update content, ask UAL to perform read and/or write operations, etc. More details on certain tasks performed by the UPI in some embodiments will become apparent from the description.

In the illustrated embodiment, boot loader 348 loads software from non-volatile memory 310 to volatile memory 350 when the updatable device is reset, and invokes the module whose software has been loaded (for example by causing executor 380 to run the loaded software). In one embodiment, boot loader 348 may be capable of writing to volatile memory 350 but not to non-volatile memory 310, and may not have access to file system 322. More details on certain tasks performed by the boot loader in some embodiments will become apparent from the description.

It should be understood that non-volatile memory 310 is shown divided into the sections illustrated in FIG. 3 in order to facilitate the reader's understanding of the methods that will be described herein for updating content. In other embodiments, non-volatile memory 310 may include more, less and/or different sections of memory than illustrated in FIG. 3. In other embodiments, additionally or alternatively non-volatile memory 310, may be divided differently than shown in FIG. 3. In other embodiments, additionally or alternatively non-volatile memory 310 may store less, more and/or different elements than illustrated in FIG. 3. In other embodiments, additionally or alternatively, the order of the sections illustrated in non-volatile memory may be changed and/or the sections may not be contiguous.

Figure 4:
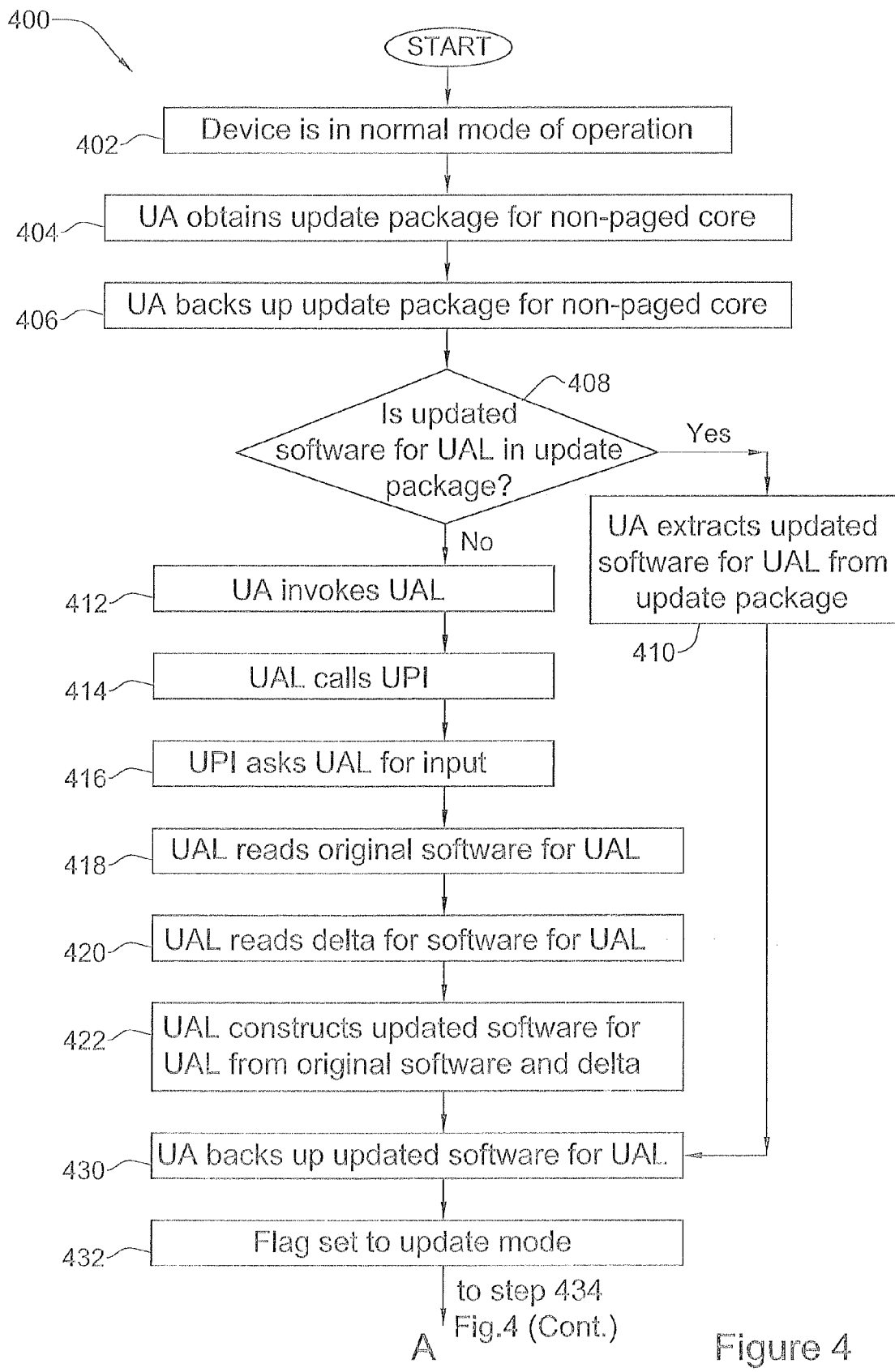
FIG. 4 is a flowchart of a method for updating content in-place, in accordance with an embodiment of the present invention.
Figure 4:
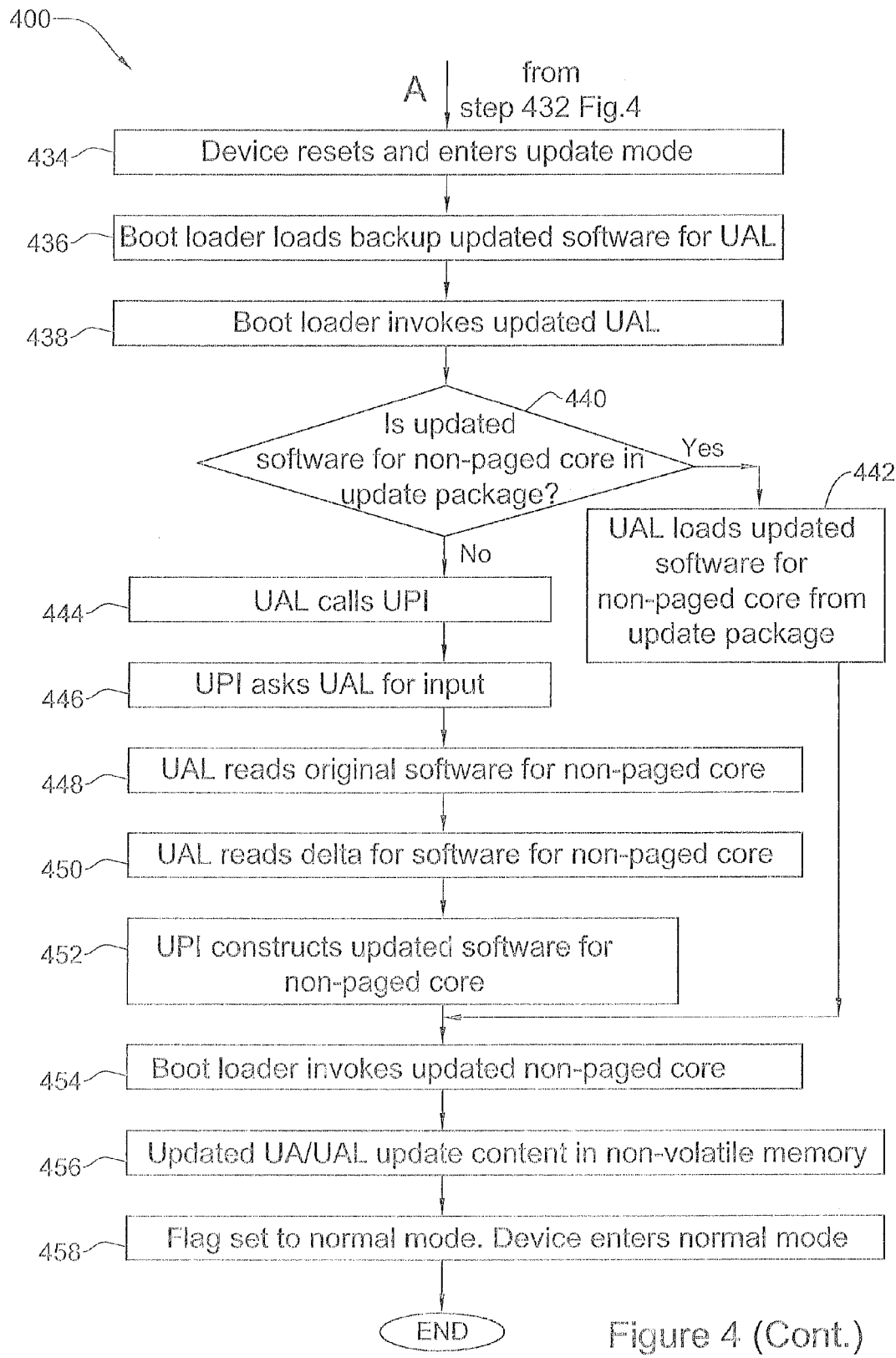

FIG. 4 is a flowchart of a method 400 for in-place updating content stored in the storage associated with an updatable device, in accordance with an embodiment of the present invention. In other embodiments, there may be more, less and/or different stages than illustrated in FIG. 4, the stages may be performed in a different order, and/or stages shown as sequential (or in parallel) may be performed in parallel (or sequentially).

It is assumed that at stage 402, the updatable device is in the normal mode of operation. For example, upon reset of the updatable device, boot loader 348 may have checked flag 332 and because flag 332 showed normal mode, boot loader 348 would have loaded the software for the non-paged core 366 from section 318 to volatile memory 350, invoked non-paged core 366, and non-paged core 366 would have started the normal mode of operation of the updatable device as is known in the art. It is also assumed that the device management application of the updatable device has previously obtained an update package 334 and stored update package 334 in non-volatile memory 310, for example in file system 322.

As mentioned above with respect to FIG. 3, non-paged core 366 is capable of performing tasks which are unrelated to the updating of content during the update process, as well as tasks relating to the updating of content during the update process. Therefore, in contrast to the prior art where during normal mode tasks solely related to the updating of content are typically although not necessarily not performed, it is assumed herein that once the non-paged core 366 has been invoked in normal mode, any tasks performable by non-paged core 366 may hypothetically be executed. Examples of tasks which may be performed in normal mode include inter-alia tasks not required for the update process, tasks performed by the UA, UAL or UPI, and/or reading/writing to non-volatile memory.

However, in the illustrated embodiment of method 400, only the first part of the update process for updating content in-place in non-volatile memory 310 is executed during the normal mode of operation, with the remainder of the update process executed during a subsequent update mode of operation. In the illustrated embodiment, the part of the update process executed during the normal mode of operation includes the backing up of the non-paged core update package and the backing up of the software for the updated UAL, as will be described now. Not all content in the original version of the software for the UAL is necessarily changed and therefore some of the content in the original and updated versions of the software of the UAL may be identical. It is noted that the part of the update process executed in normal mode does not update the software for the core stored in sections 318 and 320 and therefore does not hinder processes executable by the updatable device during the normal mode.

In stage 404, UA 368 (for which original version software was loaded to volatile memory 350 upon reset in normal mode as part of the loaded original software for non-paged core 366) obtains a non-paged core update package 360, for example by extracting the part of the update package relating to the non-paged core from update package 334 which is stored in file system 322. In another example, a separate update package for the non-paged core 360 may have been received and stored in file system 322 and in stage 404 UA 368 may read the received non-paged core update package 360. In stage 406, UA 368 stores non-paged core update package 360 in backup buffer 324. It is noted that in the illustrated embodiment, non-paged core update package 360 is stored in backup buffer 324 because conventionally boot loader 348 can not access file system 322, but boot loader 348 may read from backup buffer 324. Boot loader 348 may therefore conventionally provide the capability of reading non-paged core update package 360 from backup buffer 324 to a module which boot loader 348 invokes (see below). It is also noted that in the illustrated embodiment, UA 368 may write to non-volatile memory 310 in method 400, for example writing non-paged core update package 360 to backup buffer 324 in stage 406, by invoking the non-volatile memory read/write drivers of non-paged core 366. Therefore boot loader 348 does not need to have non-volatile memory write capabilities to perform method 400 because any writing to non-volatile memory 310 in method 400 may rely on the non-volatile memory write drivers in non-paged core 366. In other embodiments, stages 404 and 406 may be omitted. For example, in one embodiment where boot loader 348 has the capability of accessing file system 322, stages 404 and 406 may be omitted.

Depending on the embodiment, the updated software for the UAL may be extracted from the update package or may be constructed using the appropriate delta for the UAL software. Assuming first that an update package includes the new version of the software for the UAL (yes to stage 408), then in stage 410 UA 368 extracts the updated software for the UAL from the update package (e.g. from update package 334 or 360) and in stage 430 backs up the updated software for UAL 362 to non-volatile memory 310, for example to section 323.

Assuming instead that the update package includes the delta for the UAL software (no to stage 408), then in stage 412 UA 368 invokes UAL 370 (for which original version software was loaded to volatile memory 350 upon reset in normal mode as part of the loaded original software for non-paged core 366). In stage 414, UAL 370 calls UPI 372 (for which original version software was also loaded to volatile memory 350 upon reset in normal mode as part of the loaded original software for non-paged core 366). In stage 416, UPI 372 asks UAL 370 for input. In stage 418, UAL 370 reads the stored original version of the software for UAL from non-volatile memory 310, for example from section 318. Alternatively, stage 418 may be omitted because the original software for UAL was previously loaded to volatile memory 350 upon reset in normal mode as part of the loaded original software for non-paged core 366. In stage 420, UAL 370 reads the delta for the software for the UAL from the update package (e.g. from non-paged core update package 360 stored in backup buffer 324 or from update package 334 stored in file system 322). In stage 422, UPI 377 constructs in volatile memory 350 an updated version of the software for the UAL, using the read delta and original version of the software for the UAL. In stage 430, UA 368 backs up the updated version of the software for UAL 362 to non-volatile memory 310, for example to section 323.

In the illustrated embodiment, the original version of the software for UAL 370 stored in section 318 is not overwritten during normal mode so as to avoid operating in normal mode with a non-paged core comprising partially original and partially updated content. Therefore section 318 retains the original version of the software for UAL 370 even after stage 430 has been performed. It is noted that UA 368 backs up the updated version of the software for UAL 362 to non-volatile memory 310, for example to section 323 by invoking the non-volatile memory read/write drivers of non-paged core 366. It is also noted that besides the use of updated UAL 362 later in method 400, the backup updated software for UAL 362 can be retrieved in some cases where the update process has been interrupted in order to resume the update process (see, for example, the description of method 500 below).

In another embodiment, an updated version of the software for the entire updated non-paged core may be extracted or constructed and in stage 430 backed up to section 323 but the advantage of backing up only the updated software for the UAL is the small size of the software for the UAL, typically although not necessarily about 128 kilobytes. Similarly to the embodiment where the updated software for the UAL is extracted or constructed, in this embodiment, not all content in the original version of the software for the non-paged core is necessarily changed and therefore some of the content in the original and updated versions may be identical.

In stage 432, flag 332 is set to update mode by UA 368. In stage 434 the updatable device resets and enters the update mode of operation. Depending on the embodiment, the updatable device may reset immediately after flag 332 is set to update mode, may reset when convenient to the user, or may reset at a later time. For example in one embodiment, the user may be asked via a user interface of the updatable device whether or not the user is currently ready to update the updatable device. If the user indicates that the user is not ready, then in this embodiment the updatable device remains in normal mode, resetting is deferred, and the updatable device may repeat the question at a later time. It is assumed in this embodiment that either the first time the user is asked or during a subsequent time that the user is asked, the user will agree to a device reset in order to update the device. However, in one embodiment it is possible that the user does not wish to update the device and wishes to retain the original content and stage 434 is therefore deferred indefinitely. As another example, in one embodiment, the updatable device may proceed directly to resetting stage 434 after stage 432, with or without prior notice to the user that the device will be reset. Alternatively, in another example the updatable device may determine when the device should be reset without first consulting the user, and the resetting may occur with or without prior notice to the user. Continuing with the example in one embodiment, the updatable device may reset during the next recharging a non-empty battery of the updatable device, and not necessarily soon after stage 432.

In the illustrated embodiment, tasks which are completely unrelated to the update process are typically (although not necessarily) not performed during update mode. In stage 436, boot loader 348 loads the backup updated version of the software for UAL 362 (including the updated version of the software for UPI 364) from non-volatile memory 310, for example from section 323, into volatile memory 350. In stage 438, boot loader 348 invokes updated UAL 362. Assuming that boot loader 348 has the conventional capability to read from backup buffer 324, boot loader 348 provides to invoked updated UAL 362 the capability of reading non-paged core update package 360 from backup buffer 324.

Depending on whether the update package for the non-paged core includes an updated version of the software for the non-paged core, or does not include the updated version of the software but does include the delta, the updated version of the software for the non-paged core may be loaded or constructed. Assuming first that non-paged core update package 360 (stored for example in backup buffer 324) includes an updated version (yes to stage 440), then in stage 442, updated UAL 362 loads the updated software for the non-paged core from non-paged core update package 360 (stored for example in backup buffer 324) into volatile memory 350.

Assuming instead that the non-paged core update package does not include the updated version but does include the delta (no to stage 440), then in stage 444, updated UAL 362 calls updated UPI 364. In stage 446, updated UPI 364 asks updated UAL 362 for input. In stage 448, updated UAL 362 reads the stored original version of the software for non-paged core 366 from non-volatile memory 310, for example from section 318. In stage 450 updated UAL 362 reads the delta for the software for the non-paged core from non-paged core update package 360, stored for example in backup buffer 324. In stage 452, updated UPI 364 constructs in volatile memory 350 an updated version of the software for the non-paged core, using the read delta and the original version of the non-paged core.

In another embodiment, in stage 442, updated UAL 362 loads the updated software for the non-paged core except for the updated software for the UAL from non-paged core update package 360 in backup buffer 324 to volatile memory 350. Alternatively in this embodiment, updated UAL 362 reads the stored original version of the software for non-paged core except for the original version of the software for the UAL from section 318 in stage 448, reads the delta for the software for the non-paged core except for the delta for the software for the UAL in stage 450 from non-paged core update package 360 stored in backup buffer 324, and in stage 452 UPI 364 constructs in volatile memory 350 an updated version of the software for the non-paged core (excluding the updated UAL), using the read delta and original version of the software for the non-paged core (excluding the UAL). In this embodiment, the backed-up updated software for UAL 362 which was loaded for example from backup buffer 323 into volatile memory 350 in stage 436 supplements the loaded or constructed updated software for the non-paged core (excluding for the UAL).

It is noted that in alternative embodiments, updated UAL 362 may instead respectively read the delta in stage 450 or load the updated version in stage 442 of the software for the non-paged core from update package 334 stored in file system 322, and the decision of stage 440 would relate in these alternative embodiments to whether or not the updated software for the non-paged core is in update package 334. These alternative embodiments may apply for any reason, for example in the case where stages 404 and 406 were omitted because boot loader 348 has the capability of accessing file system 322 and can provide the capability to invoked updated UAL 362 and there was therefore no separate backing up of a non-paged core update package.

In another embodiment where the updated software for the entire non-paged core was extracted or constructed and in stage 430 backed up to section 323, then stages 436 to 452 may be omitted. Instead, in this embodiment, boot loader 354 loads the backed-up updated software for the non-paged core from non-volatile memory 310 (for example from section 323) to volatile memory 350 after stage 434 and before stage 454.

In stage 454, boot loader 348 invokes the updated non-paged core whose software has come to be located in volatile memory 350 due to any of the various embodiments described above. It is noted that the updated non-paged core comprises inter-alia an updated UA and an updated UAL (which includes an updated UPI).

In stage 456, the software for the paged core 336 and the software for the non-paged core 366 which are located in sections 320 and 318 respectively of non-volatile memory 310, are updated in place (i.e. so that updated content overwrites original content), using any suitable in-place updating techniques. In one embodiment of stage 456, the updated UA invokes the updated UAL to load into and/or construct in volatile memory 350 the updated software for the paged core and the updated software for the non-paged core and to write in-place the updated software to sections 320 and 318 respectively of non-volatile memory 310. In another embodiment of stage 456, the updated UA copies the updated version of the software for the non-paged core which is already located in volatile memory 350 to section 318 of non-volatile memory 310 (replacing the original version of the software). In this embodiment, the updated UA invokes the updated UAL to load into or construct in volatile memory 350 the updated software for the paged core and to write the updated software in place to section 320 of non-volatile memory 310. For example, the updated UAL may load into or construct in volatile memory the updated software for the paged core (and optionally for the non-paged core) by performing stages 440 to 452 for the paged core and optionally for the non-paged core. In this example, if construction of the updated software (for the paged core and optionally for the non-paged core) is required, the updated UAL will call the updated UPI, the updated UPI will ask the updated UAL for input, the updated UAL will read the original version of the software and the delta, and the UPI will construct the updated version of the software in volatile memory 350. As mentioned above, the updated UAL may write to non-volatile memory 310 by invoking the non-volatile memory read or write driver(s) after receiving a pointer to the non-volatile memory read or write driver(s) from the updated UA. It should be understood that when loading into or constructing in volatile memory 350 software for the paged core, the software for the paged core is typically although not necessarily not all loaded into and/or constructed in volatile memory 350 at one time due to the large size thereof.

It is noted that not all content in the original version of the software for the non-paged core 366 and paged core 336 is necessarily changed and therefore some of the content in the original and updated versions may be identical. In some embodiments, other content which is not part of the software for the core may additionally or alternatively be updated in-place in stage 456. For example some or all of the content in file system 322 may be updated in-place to new content.

As mentioned above, the invention does not limit the type of in-place update performed in stage 456 to any particular in-place update, and depending on the embodiment, any suitable in-place update may be performed. For example, U.S. Pat. No. 6,018,747 to Burns et al., and US Publication Number 20050216530 describe examples of various techniques for in-place updating and are incorporated by reference herein, although the invention is not limited to these examples.

In some embodiments of stage 456, assuming non-volatile memory 310 is organized in discrete areas, referred to, e.g., as blocks or sectors, the first block of content to be updated may be dynamically selected, or may be the first in an update sequence specified in the update package. The update sequence specified in the update package may have been decided randomly, may be based on the order of the blocks in non-volatile memory 310, may have been selected in order to limit the potential number of write before read conflicts, or for any other reason. For example, the aforementioned U.S. Pat. No. 6,018,747 to Burns et al., and US Publication Number 20050216530 to Meller et al. describe determination of update sequences in update packages. Similarly, in embodiments with dynamic selection, the dynamic selection may be random, may be based on the order of the blocks in non-volatile memory 310, may be made in order to limit the potential number of write before read conflicts, or may be made for any other reason.

In some embodiments of stage 456, the updating may include storage of data into a designated non-volatile back-up buffer, for example one of backup buffers 324. Examples of what may be stored in buffer(s) 324 include inter-alia: original or updated block(s) (at least until the corresponding updated block has been safely written to non-volatile memory 310), any part of original block(s) which is needed for later updating of other block(s) (thereby preventing write before read conflicts) and/or data which will allow a continuation of the update process if there is an interruption which erases volatile memory. The storage in backup buffer(s) 324 may occur immediately prior to the overwriting of the related original block in non-volatile memory 310 (or of the first of a plurality of related original blocks) and/or may occur earlier on, for example prior to overwriting any original content in non-volatile memory 310. However in other embodiments, the update process may not include storage of data in a designated backup buffer. It should be noted that although storage in backup buffer(s) 324 may enhance reliability of the update process in case of interruption and/or prevent write before read conflicts, in other embodiments, other techniques may be used additionally or alternatively. For example, another technique which may increase reliability of the update process and/or prevent write before read conflicts is the storing of data in the update package which itself is stored in non-volatile memory 310, for example in file system 322. Examples of data which may be stored in the update package include inter-alia: add commands which were converted from copy commands, and data which will allow a continuation of the update process if there is an interruption which erases volatile memory. It should be understood that the storage in backup buffer 324 and/or in the update package is not required by all embodiments of the invention.

With the completion of the update process after stage 456, flag 332 is set by updated UA 368 to normal mode in stage 458. In one embodiment, boot loader 348 loads the updated software for non-paged core 366 from section 318 in non-volatile memory 310 to volatile memory 350 and invokes the updated non-paged core 366. The updated non-paged core (whose software was loaded in stage 458 or whose software was already in volatile memory 350 prior to stage 458) then starts the normal mode of operation of the updatable device as is known in the art. Method 400 then ends.

It is noted that an update process is considered "reliable", provided that the update process can be resumed even subsequent to an interruption which caused volatile memory to be erased and possibly a block in storage to be corrupted. It should be appreciated that the content of this block is sometimes corrupted during the interruption and sometimes not. Yet, because it is sometimes impossible to determine or to be certain whether the content thereof is corrupted or not, the content stored in this block is considered as undependable content. It will now be shown how the update process described herein can be resumed in case of interruption.

If there is an interruption which erases volatile memory 350 prior to the completion of the storage of non-paged core update package 360 in backup buffer 324 in stage 406, then in one embodiment upon resumption method 400 may be restarted from the beginning. If instead there is an interruption which erases volatile memory 350 subsequent to the completion of stage 406 but prior to the completion of the storage of a backup of the updated software for at least part of the non-paged core (for example the UAL) to section 323 in stage 430, then in one embodiment upon resumption, method 400 may be re-executed beginning with stage 408 or beginning with any stage of method 400 earlier than stage 408. If instead there is an interruption which erases volatile memory 350 subsequent to the completion of stage 430 but prior to overwriting any original content in stage 456, then in one embodiment upon resumption, method 400 may be re-executed beginning with stage 432 or beginning with any stage of method 400 earlier than stage 432. If there is instead an interruption which erases volatile memory subsequent to the completion of stage 456, then in one embodiment upon resumption either normal mode may be started or normal mode may be continued with the updated version.

Figure 5:
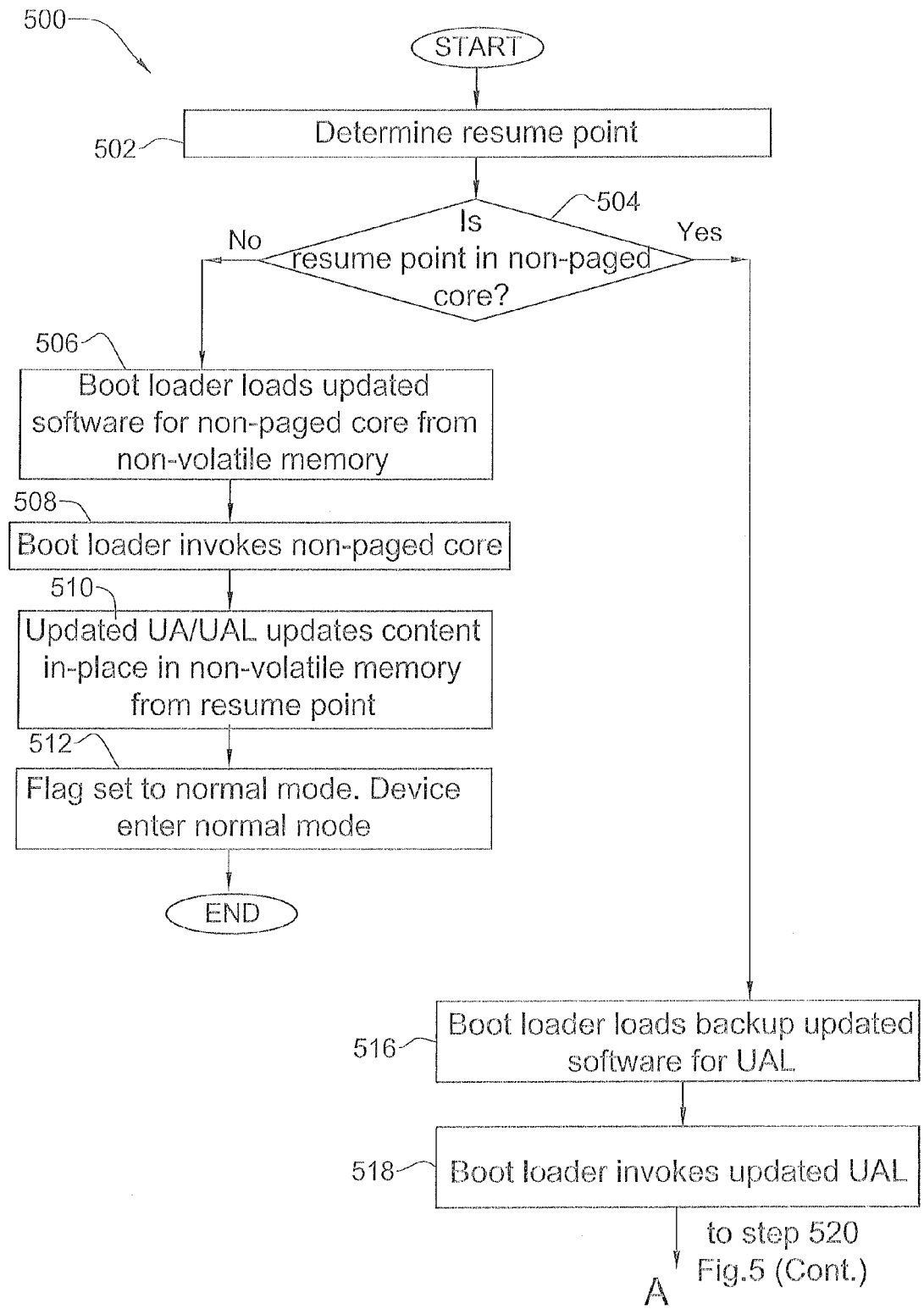
FIG. 5 is a flowchart of a method for resuming an in-place update process, in accordance with an embodiment of the present invention.
Figure 5:
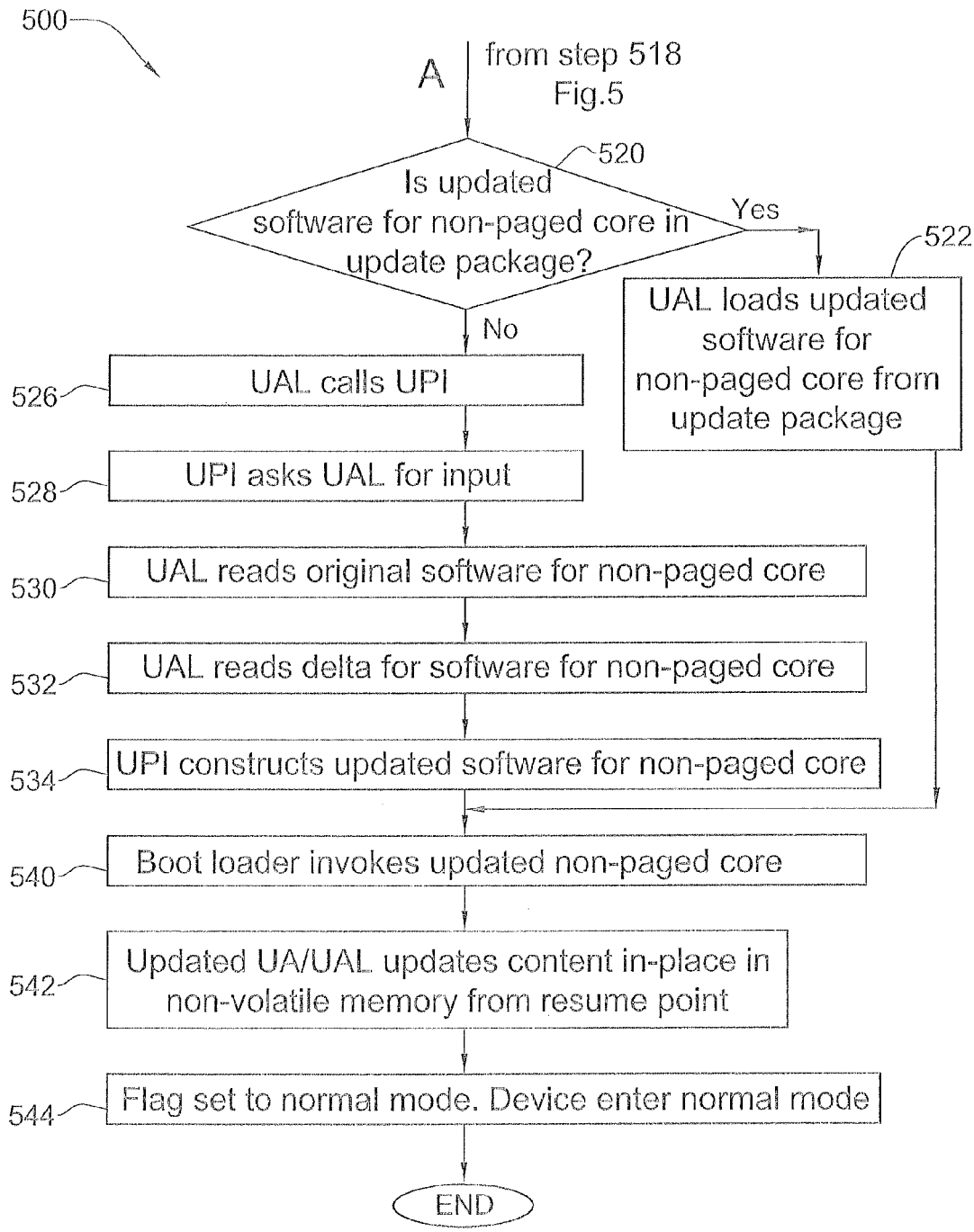

FIG. 5 is a flowchart of a method 500 for resuming the in-place update process after an interruption which occurred during stage 456 when only part of the original content to be updated had been overwritten in non-volatile memory 310, in accordance with an embodiment of the present invention. In other embodiments, there may be more, less and/or different stages than illustrated in FIG. 5, the stages may be performed in a different order, and/or stages shown as sequential (or in parallel) may be performed in parallel (or sequentially).

Method 500 assumes that the interruption erased volatile memory 350 and occurred during stage 456 when non-volatile memory 310 includes both original content which still requires update and updated content.

In the embodiment of method 500 illustrated in FIG. 5, it is assumed that in stage 456 of method 400 the original version of the software for non-paged core 366 in non-volatile memory 310, for example in section 318, is first overwritten with the updated version and only afterwards, the original version of the software for paged core 336 in non-volatile memory 310, for example in section 320, and any other (non-core) content to be updated in non-volatile memory 310 is overwritten with the updated version. However, the reverse order is also possible and discussed further below.

In the illustrated embodiment of FIG. 5, upon resumption, the resume point is determined in stage 502 as is known in the art. The resume point may be determined for example as in US Published Application Number 20050216530 to Meller et al, which is incorporated by reference herein.

If the resume point is not in the non-paged core (no to stage 504), it is assumed that the software for the non-paged core has already been updated because as stated above it is assumed that the software for the non-paged core is updated first. Therefore in stage 506, boot loader 348 loads the updated software for the non-paged core 366 from non-volatile memory 310, for example from section 318, to volatile memory 350. In stage 508, boot loader 348 invokes updated non-paged core 366. In stage 510, updated UA 368 invokes updated UAL 370 to begin updating in-place the software for the paged core (and any other content in non-volatile memory 310 that still requires updating), at least from the resume point, where the in-place updating that is performed may use any appropriate in-place updating techniques as discussed above with reference to stage 456. Although content before the resume point does not need to be updated in place (since the content has already been updated prior to the interruption), the invention does not preclude the possibility of rewriting such content during stage 510. In stage 512, after the completion of the update process, flag 332 is set to normal mode by updated UA 368. Updated non-paged core 366 then starts the normal mode of operation of the updatable device as is known in the art. Method 500 then ends.

If instead, the resume point is in the non-paged core (yes to stage 504), then in stage 516, boot loader 348 loads the backed-up updated software for UAL 362 (including the updated version of the software for UPI 364) from non-volatile memory 310 (for example from section 323) into volatile memory 350. In stage 518, boot loader 348 invokes updated UAL 362. Assuming that boot loader 348 has the conventional capability to read from backup buffer 324, boot loader 348 provides to invoked updated UAL 362 the capability of reading non-paged core update package 360 from backup buffer 324.

Depending on whether the update package for the non-paged core includes an updated version of the software for the non-paged core or does not include the updated version of the software but does include the delta, the updated version of software for the non-paged core may be loaded or constructed. Assuming first that non-paged core update package 360 (stored for example in backup buffer 324) includes an updated version (yes to stage 520), then in stage 522, updated UAL 362 loads the updated software for the non-paged core from non-paged core update package 360 (stored for example in backup buffer 324) to volatile memory 350.

Assuming instead that the non-paged core update package does not include the updated version but does include the delta (no to stage 520), then in stage 526, updated UAL 362 calls updated UPI 364. In stage 528, updated UPI 364 asks updated UAL 362 for input. In stage 530, updated UAL 362 reads from the resume point the stored original version of the software for the non-paged core from non-volatile memory 310, for example from section 318. In stage 532 updated UAL 362 reads the delta for the software for the non-paged core from non-paged core update package 360 stored for example in backup buffer 324. In stage 534, updated UPI 364 constructs in volatile memory 350 an updated version of the software for the non-paged core from the resume point, using the read delta from the interrupted instruction and the original version of the non-paged core from the resume point.

In another embodiment, in stage 522, updated UAL 362 loads the updated software for the non-paged core except for the updated software for the UAL from non-paged core update package 360 in backup buffer 324 to volatile memory 350. Alternatively in this embodiment, in stage 530 updated UAL 362 reads from the resume point the stored original version of the software for the non-paged core (except for the original version of the software for the UAL) from section 318, reads in stage 532 the delta for the software for the non-paged core except for the delta for the software for the UAL from non-paged core update package 360 stored in backup buffer 324, and in stage 534 UPI 364 constructs in volatile memory 350 an updated version of the software for the non-paged core (excluding the updated UAL) from the resume point, using the read delta from the interrupted instruction and the original version of the software for the non-paged core (excluding the UAL) from the resume point. In this embodiment, the backed-up updated software for UAL 362 which was loaded for example from backup buffer 323 into volatile memory 350 in stage 516 supplements the read or constructed updated software for the non-paged core (excluding for the UAL).

It is noted that in alternative embodiments, updated UAL 362 may instead respectively read the delta in stage 532 or load the updated version in stage 522 of the software for the non-paged core from update package 334 stored in file system 322, and the decision of stage 520 would relate in these alternative embodiments to whether or not the updated software for the non-paged core is in update package 334. These alternative embodiments may apply for any reason, for example in the case where stages 404 and 406 were omitted because boot loader 348 has the capability of accessing file system 322 and can provide the capability to invoked updated UAL 362 and there was therefore no separate backing up of a non-paged core update package.

In another embodiment where the updated software for the entire non-paged core was extracted or constructed and in stage 430 backed up to section 323, then stages 516 to 534 may be omitted. Instead, in this embodiment, boot loader 354 loads the backed up updated software for the non-paged core from non-volatile memory 310 (for example from backup buffer 323) to volatile memory 350 after a yes to stage 504 and before stage 540.

In stage 540 boot loader 348 invokes the updated non-paged core whose software has come to be located in volatile memory 350 due to any of the various embodiments described above. It is noted that the updated non-paged core includes inter-alia an updated UA and an updated UAL (which includes an updated UPI).

In stage 542, the updated UA and the updated UAL update in-place, software content for the non-paged core at least from the resume point and then software content for the paged core (and any other content in non-volatile memory 310 that needs to be updated), where the in-place updating that is performed may use any appropriate in-place updating techniques as discussed above with reference to stage 456 of method 400. For example, in one embodiment of the in-place update, the updated software for the non-paged core in volatile memory 350 is first copied by the updated UA to section 318 of non-volatile memory 310, beginning at least with the resume point. In this embodiment after the copying, the updated UA invokes the updated UAL to construct or load updated software content for the paged core (and any other content in non-volatile memory 310 that needs to be updated) in volatile memory 350 and write the updated content in-place to section 320 and to any other relevant section of non-volatile memory 310. As another example, in one embodiment of the in-place update, the updated UA invokes the updated UAL to construct and/or or load in volatile memory 350 software content for the non-paged core, paged core, and any other content in non-volatile memory 310 that needs to be updated, and to write the updated content in-place, where for the non-paged core the in-place updating is at least from the resume point. Although content before the resume point does not need to be updated in place (since the content has already been updated prior to the interruption), the invention does not preclude the possibility of rewriting such content during stage 542.

In stage 544, after the completion of the update process, flag 332 is set to normal mode by updated UA 368. In one embodiment, boot loader 348 loads the updated software for non-paged core 366 from section 318 in non-volatile memory 310 to volatile memory 350 and invokes the updated non-paged core 366. The updated non-paged core (whose software was loaded in stage 544 or was already in volatile memory 350 prior to stage 544) then starts the normal mode of operation of the updatable device as is known in the art. Method 500 then ends.

In other embodiments, it is assumed that in stage 456 the original version of the software for paged core 336 in non-volatile memory 310, for example in section 320 (and any other content in non-volatile memory that requires to be updated and is not part of the software for the core) is overwritten with the updated version before the original version of the software for non-paged core 366 in non-volatile memory 310, for example in section 318, is overwritten with the updated version. In these embodiments, regardless of where the resume point is, stages 516 to 544 are performed, and therefore stages 504 to 512 may be omitted. In some of these embodiments where the resume point is in the paged core (or in content unrelated to the core), the updated UA and the updated UAL update in-place in stage 542, software content for the paged core (and any other content in non-volatile memory 310 that needs to be updated) at least from the resume point and then software content for the non-paged core, where the in-place updating that is performed may use any appropriate in-place updating techniques as discussed above with reference to stage 456 of method 400. For example in one of these embodiments in stage 542 the updated UA, invokes the updated UAL to construct or load software for the paged core (and any other non-core content in non-volatile memory 310 that needs to be updated) and to write the updated content in-place to non-volatile memory 310 at least from the resume point. The updated UA, then copies the updated non-paged core in volatile memory 350 to section 318 of non-volatile memory 310, or the updated UA invokes the updated UAL to construct or load updated software content for the non-paged core and to write the updated content in-place to section 318. In some of these embodiments where the resume point is instead in the non-paged core, in stage 542, the updated UA and the updated UAL update in-place, software content for the non-paged core (at least from the resume point), where the in-place updating that is performed may use any appropriate in-place updating techniques as discussed above with reference to stage 456 of method 400. For example, in one of these embodiments, in stage 542 the updated UA copies the updated non-paged core in volatile memory 350 to section 318 of non-volatile memory 310 (at least from the resume point), or the updated UA invokes the updated UAL to construct or load updated software content for the non-paged core and to write the updated content in-place (at least from the resume point) to section 318. Although content before the resume point does not need to be updated in place (since the content has already been updated prior to the interruption), the invention does not preclude the possibility of rewriting such content during stage 542. Similarly to what was described above, in embodiments where the software for the paged core is updated in place prior to the software of the non-paged core, in stage 544, with the completion of the update process, flag 332 is set to normal mode. In one of these embodiments, boot loader 348 loads the software for updated non-paged core 366 from non-volatile memory 310, for example from section 318, to volatile memory 350 and invokes the updated non-paged core 366. The updated non-paged core (whose software was loaded in stage 544 or already in volatile memory 350 prior to stage 544) starts the normal mode of operation of the updatable device as is known in the art. Method 500 then ends.

It should be understood that in various embodiments of the methods discussed above, when loading into or constructing in volatile memory 350 software for the paged core, the software for the paged core is typically although not necessarily not all loaded into and/or constructed in volatile memory 350 at one time due to the large size thereof.

In the same way, the invention is not limited to cellular networks and/or to cellular telephones 102. It should be appreciated that cellular telephones belong to a group referred to as embedded devices. There are other types of embedded devices, for example: Personal Digital Assistants (PDAs), set-top boxes and other consumer electronic devices which are controlled and operated by a CPU and software and therefore are associated with storages for storing content, and sometimes it is required to update the content stored therein. Such consumer electronic device can be Cameras, e-book readers, Mobile Internet Devices (MID), Navigation systems, car infotainment systems, and more. Embedded device can be also general utility home appliances which are electronically controlled by a CPU and Software, such as washing machines, DVD players, Blue-ray players and other home entertainment systems. Furthermore, embedded devices can medical devices which are controlled by CPU and software, whether outside the human body or inside the human body, such as pacemakers. Embedded devices can also be part of avionic and aerospace control systems involved in guidance and other functions of the craft in which they are embedded in. All these examples of embedded device represent devices associated with storage holding content which sometimes may require updating. There are many more examples of embedded devices and the above provided examples just demonstrate the possible variety and should not be construed as a concise list. Yet, it is possible to update also content stored in storages associated with non-embedded devices, such as PCs or other general purpose computers.

For example, a PC, or any other computer, can store files that include data required for its operation or for operation of programs executing therein (such as "info files" or "dot files" known for those versed in the art). Sometimes it is required to update this data, for example, via communication lines, e.g., via the Internet or via any other communication means.

Understanding this, instead of using terms such as "telephones", "PDAs" "consumer electronic devices", "computers", "PCs", etc., the term "updatable devices" or "devices" will be used hereinafter, and it should be noted that the term "updatable device" or "device" as used herein can refer to any device that is associated with a storage 107 and allows updating content stored therein.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of in-place updating an original version of content to an updated version of content, wherein the original version of content is located in a paged memory part and a non-paged memory part of a core memory section of a non-volatile memory storage device and wherein (i) the non-paged memory part comprises an original update agent configured to perform read/write tasks and an original update library configured to wrap an update installer for performing the update task, (ii) the content of the non-paged memory part comprises procedures defining tasks configured to be used during an update process and during one or more normal mode processes unrelated to an update process, and the content of the non-paged memory part is configured to be loaded in its entirety from the non-volatile memory storage device to a volatile memory, and (iii) the non-volatile memory storage device is configured to be used in a normal mode of operation and in an update mode of operation, the method comprising:
(i) when the non-volatile memory storage device is being used in the normal mode of operation:
loading the content of the non-paged memory part into the volatile memory and invoking the content of the non-paged memory part;
obtaining an update package required for in-place updating the original version of content to the updated version of content;
obtaining a new update library; and
storing the new update library in a second part of the non-volatile memory storage device; and
(ii) when the non-volatile memory storage device is being used in the update mode of operation:
providing an updated version of the content of the non-paged memory part in the volatile memory; and
in-place updating the original version of content to the updated version of content, in the non-volatile memory storage device, using the obtained new update library and the update package.

2. The method of claim 1, wherein obtaining the new update library comprises extracting the new update library from the update package.

3. The method of claim 1, wherein obtaining a new update library comprises:
deriving from the update package, a part required for at least updating the original update library to the new update library;
storing the part of the update package in a third part of the non-volatile memory storage device, wherein the new update library is generated, and thereby obtained, by using the original update library from the non-paged memory part of the core memory section and the part of the update package from the third part of the non-volatile memory storage device.

4. The method according to claim 1, wherein the in-place updating further comprises invoking the updated version of the non-paged memory part of content in the volatile memory.

5. The method according to claim 1, wherein the providing of an updated version of the non-paged memory part of content further comprises:
invoking the new update library; and
generating in the volatile memory an updated version of the non-paged memory part of content using the original non-paged memory part of the content in the non-volatile memory storage device and the update package wherein the updated version of the non-paged memory part of content is generated such that the updated version of the non-paged memory part of content does not override the new update library in the volatile memory.

6. The method of claim 1, wherein the providing of the updated version of the non-paged memory part further comprises:
loading into the volatile memory an updated version of part of the non-paged memory part and invoking said part, wherein said invoked part constructs in volatile memory or loads into volatile memory an updated version of said non-paged memory part.

7. The method of claim 1, wherein said providing of an updated version of the non-paged memory part of content further comprises:
loading into the volatile memory an updated version of the non-paged memory part of content.

8. The method of claim 1, wherein the providing of the updated version of the non-paged memory part of content further comprises:
loading into the volatile memory an updated version of part of said non-paged memory part of content and invoking said part, wherein said invoked part constructs in the volatile memory or loads into the volatile memory an updated version of the non-paged memory part of content excluding said part.

9. A system for updating an original version of content to an updated version of content, in a non-volatile memory storage device that enables a normal mode and an update mode, the system comprising:
a non-paged memory part of a core memory section in the non-volatile memory storage device, said non-paged memory part including (i) procedures defining tasks configured to be use during an update process and during one or more processes unrelated to the update process, (ii) an original update library, and (iii) an original update agent;
a volatile memory, wherein the content of the non-paged memory part is configured to be loaded in its entirety from the non-volatile memory storage device to a volatile memory; and
a boot loader, wherein
the non-paged memory part comprises an original update library and an original update agent, said original update library is being configured to wrap an update installer for
said original update agent is configured to (i) obtain an update package comprising an update file including commands and data required for in-place updating the original version of content to the updated version of content, (ii) derive, from the update file, a library file comprising commands and data required for at least updating the update library in the non-paged memory part to obtain a new update library; and (iii) store the library file in the non-volatile memory storage device, and
said boot loader is configured to (i) obtain the new update library and (ii) store the new update library in a second part of the non-volatile memory storage device.

10. The system according to claim 9, wherein the update agent and the boot loader are arranged, in cooperation, to in-place update the original version of content to the updated version of content, in the non-volatile memory storage device, using the new update library, stored in the second part of the non-volatile memory storage device.

11. The system according to claim 9, wherein the update agent obtains the new update library by extracting the new update library from the update package.

12. The system according to claim 9, wherein in obtaining a new update library, the update agent is further arranged to:
derive from the update package, a part required for at least updating the original update library to the new update library;
store the part of the update package in a third part of the non-volatile memory storage device; and
generate the new update library using the original update library from the non-paged memory part and the part of the update package from the third part of the non-volatile memory storage device.

13. The system according to claim 10, wherein in updating, the update agent and the boot loader are arranged, in cooperation, to provide in the volatile memory, an updated version of the non-paged memory part of content.

14. The system according to claim 13, wherein the update agent and the boot loader are further arranged, in cooperation, to:
- invoke the new update library;
- generate in the volatile memory an updated version of the non-paged memory part of content using the original non-paged memory part of content in the non-volatile memory storage device and the update package, wherein the generating is such that the updated version of the non-paged memory part of content does not override the new update library in the volatile memory.

\* \* \* \* \*